United States Patent
DeSpiegelaere et al.

(10) Patent No.: US 9,314,008 B2
(45) Date of Patent: Apr. 19, 2016

(54) ICE FISHING STORAGE AND TRANSPORT SYSTEM

(71) Applicants: Brenda Lee DeSpiegelaere, Shoreview, MN (US); Harley G. Hughes, Shoreview, MN (US)

(72) Inventors: Brenda Lee DeSpiegelaere, Shoreview, MN (US); Harley G. Hughes, Shoreview, MN (US)

( * ) Notice: Subject to any disclaimer, the term of this patent is extended or adjusted under 35 U.S.C. 154(b) by 116 days.

(21) Appl. No.: 13/782,034

(22) Filed: Mar. 1, 2013

(65) Prior Publication Data
US 2013/0227875 A1  Sep. 5, 2013

Related U.S. Application Data

(63) Continuation-in-part of application No. 13/233,136, filed on Sep. 15, 2011.

(60) Provisional application No. 61/456,278, filed on Nov. 4, 2010.

(51) Int. Cl.
| | | |
|---|---|---|
| *A01K 97/06* | (2006.01) | |
| *A01K 97/10* | (2006.01) | |
| *A01K 97/01* | (2006.01) | |
| *A01K 97/08* | (2006.01) | |

(52) U.S. Cl.
CPC ............... *A01K 97/01* (2013.01); *A01K 97/06* (2013.01); *A01K 97/08* (2013.01); *A01K 97/10* (2013.01)

(58) Field of Classification Search
CPC ....... A01K 97/06; A01K 97/10; A01K 97/01; A01K 97/08
USPC ................. 43/54.1, 55–57, 21.2; 206/315.11; 224/922, 920; 375/173; 367/173
See application file for complete search history.

(56) References Cited

U.S. PATENT DOCUMENTS

| | | | | | |
|---|---|---|---|---|---|
| 1,587,785 | A | * | 6/1926 | Marsh et al. ....................... 43/56 |
| 2,452,279 | A | * | 10/1948 | Young ............................ 43/21.2 |
| 2,870,932 | A | * | 1/1959 | Davis ................................ 43/56 |
| 2,995,855 | A | * | 8/1961 | Bell .............................. 43/21.2 |
| 3,603,019 | A | * | 9/1971 | Smeltzer ........................ 43/21.2 |
| 3,653,144 | A | * | 4/1972 | Rocka ................... A01K 97/08 |
| | | | | | 43/21.2 |

(Continued)

FOREIGN PATENT DOCUMENTS

| | | | | |
|---|---|---|---|---|
| DE | 3626574 A1 | * | 2/1988 | ............. A01K 97/10 |
| JP | 08056541 A | * | 3/1996 | ............. A01K 97/10 |

(Continued)

OTHER PUBLICATIONS

Application and File History of U.S. Appl. No. 13/233,136, Inventors DeSpiegelaere et al., filed Sep. 15, 2011.

*Primary Examiner* — Darren W Ark
(74) *Attorney, Agent, or Firm* — Patterson Thuente Pederson, P.A.

(57) ABSTRACT

An ice fishing equipment storage and transport system or kit provides easier and more organized retention of ice fishing equipment when being stored, transported, or in use. System can include a container such as a bucket having an open interior. A sleeve can be selectively attachable to the bucket and include one or more rod holder tubes, the rod holder tubes having one or more channels or slots adapted to hold an ice fishing rod or tip-up. A bucket container extension portion can attach to the bucket to capture and retain the sleeve between the bucket and the extension. The system can also include a lid for covering the bucket. In some embodiments, the lid can include additional features such as a selectively attachable transducer guide channel and an opening allowing for passage of a battery cable.

14 Claims, 15 Drawing Sheets

(56) References Cited

U.S. PATENT DOCUMENTS

| | | | | |
|---|---|---|---|---|
| 3,667,708 | A * | 6/1972 | Smeltzer | 43/21.2 |
| 3,744,688 | A * | 7/1973 | Kezer | B62J 7/06 |
| | | | | 224/922 |
| 3,751,845 | A * | 8/1973 | van Leeuwen | 43/56 |
| 3,987,574 | A * | 10/1976 | Pennino | 43/54.1 |
| 3,989,213 | A * | 11/1976 | Allen | 248/214 |
| 4,198,775 | A * | 4/1980 | Leisner | 43/21.2 |
| 4,372,072 | A * | 2/1983 | Comeau | 43/21.2 |
| 4,407,089 | A * | 10/1983 | Miller | 43/21.2 |
| 4,638,593 | A * | 1/1987 | Garcia | A01K 97/06 |
| | | | | 43/54.1 |
| D288,953 | S * | 3/1987 | Hansen | D22/136 |
| 4,676,019 | A * | 6/1987 | Engles | 43/21.2 |
| 4,759,148 | A * | 7/1988 | Love | 43/54.1 |
| 4,845,881 | A * | 7/1989 | Ward | 43/21.2 |
| 4,871,099 | A * | 10/1989 | Bogar, Jr. | 43/21.2 |
| 4,888,747 | A * | 12/1989 | Williams | G10K 11/006 |
| | | | | 367/173 |
| 4,979,153 | A * | 12/1990 | Terry | 367/173 |
| 5,038,511 | A * | 8/1991 | Gessner | 43/21.2 |
| 5,052,146 | A * | 10/1991 | Resnick | 43/21.2 |
| 5,125,183 | A * | 6/1992 | Tisdell | 43/54.1 |
| 5,131,179 | A * | 7/1992 | McEwen | 43/21.2 |
| 5,142,809 | A * | 9/1992 | O'Brien | A01K 97/10 |
| | | | | 43/21.2 |
| 5,184,797 | A * | 2/1993 | Hurner | 43/21.2 |
| 5,203,815 | A * | 4/1993 | Miller | 43/21.2 |
| 5,230,646 | A * | 7/1993 | Thorup | 367/173 |
| 5,261,561 | A * | 11/1993 | Hodges, Jr. | 43/54.1 |
| 5,271,520 | A * | 12/1993 | McAfee | 206/315.11 |
| 5,303,500 | A * | 4/1994 | Luukonen | 43/54.1 |
| 5,305,542 | A * | 4/1994 | Phelps | 43/21.2 |
| 5,319,877 | A * | 6/1994 | Hagan | 43/54.1 |
| 5,337,892 | A * | 8/1994 | Zaffina | 43/54.1 |
| 5,435,473 | A * | 7/1995 | Larkum | 224/922 |
| 5,437,122 | A * | 8/1995 | Wilson | 43/21.2 |
| 5,460,306 | A * | 10/1995 | Rudd | 43/21.2 |
| 5,491,823 | A | 2/1996 | Ruttenberg | |
| 5,571,228 | A * | 11/1996 | McMurtrie | 43/21.2 |
| 5,632,427 | A * | 5/1997 | Gattuso et al. | 43/21.2 |
| 5,634,291 | A * | 6/1997 | Pham | 43/56 |
| 5,659,995 | A * | 8/1997 | Hoffman | 43/54.1 |
| D384,391 | S * | 9/1997 | Bastian | D22/148 |
| 5,697,183 | A * | 12/1997 | Walker | 43/21.2 |
| 5,715,952 | A * | 2/1998 | Chichetti | 224/922 |
| 5,755,057 | A * | 5/1998 | Dancer | 43/54.1 |
| 5,802,760 | A * | 9/1998 | Campbell | 43/54.1 |
| 5,813,164 | A * | 9/1998 | Liberto | 43/21.2 |
| 6,029,872 | A * | 2/2000 | Ellington | 43/21.2 |
| 6,073,387 | A * | 6/2000 | Torkilsen | A01K 97/01 |
| | | | | 43/54.1 |
| 6,254,055 | B1 * | 7/2001 | Lamberson, Jr. | A01K 97/10 |
| | | | | 43/21.2 |
| 6,364,150 | B1 * | 4/2002 | Persinger | A01K 97/06 |
| | | | | 43/54.1 |
| 6,487,814 | B1 * | 12/2002 | Arredondo et al. | 43/54.1 |
| 6,530,170 | B1 * | 3/2003 | Sweeney | 43/21.2 |
| 6,626,409 | B1 * | 9/2003 | Thompson | 43/21.2 |
| 6,658,786 | B1 * | 12/2003 | Williams | 43/54.1 |
| 6,715,230 | B1 * | 4/2004 | Klein | 43/54.1 |
| 6,729,066 | B1 * | 5/2004 | Howley | 43/54.1 |
| 6,820,364 | B1 * | 11/2004 | Tyson | 43/56 |
| 6,883,268 | B2 * | 4/2005 | Fraser | 43/54.1 |
| 7,036,267 | B2 * | 5/2006 | Klein | 43/54.1 |
| 7,089,699 | B2 * | 8/2006 | Borgeat | 43/18.1 R |
| 7,150,123 | B1 * | 12/2006 | Fox | 43/54.1 |
| 7,213,361 | B1 * | 5/2007 | Perigo, Sr. | A01K 97/10 |
| | | | | 43/21.2 |
| 7,219,464 | B1 * | 5/2007 | Kujawa | 43/21.2 |
| 7,230,882 | B2 * | 6/2007 | Swisher | F16M 11/24 |
| | | | | 367/173 |
| 7,305,793 | B1 * | 12/2007 | Macdonald | 43/54.1 |
| 7,389,608 | B1 * | 6/2008 | MacKay | A01K 97/05 |
| | | | | 43/54.1 |
| 7,594,353 | B2 * | 9/2009 | Lucky | 43/21.2 |
| 7,644,535 | B2 * | 1/2010 | Sloop | 43/56 |
| 7,650,713 | B1 * | 1/2010 | Peede | 43/21.2 |
| 7,739,827 | B2 * | 6/2010 | Keller | 43/21.2 |
| 7,746,727 | B2 * | 6/2010 | Bacarella et al. | 367/173 |
| 7,908,786 | B2 * | 3/2011 | Bailey | 43/21.2 |
| 7,971,839 | B2 * | 7/2011 | Upchurch | B63B 25/002 |
| | | | | 367/173 |
| 8,052,020 | B1 * | 11/2011 | Wurtz | 43/54.1 |
| 8,127,965 | B1 * | 3/2012 | Miller | B25H 3/04 |
| | | | | 206/373 |
| 8,375,622 | B1 * | 2/2013 | Holzmann, Jr. | 43/21.2 |
| 8,393,111 | B1 * | 3/2013 | Johnson | 43/21.2 |
| 8,783,748 | B1 * | 7/2014 | Quinn | A01K 97/08 |
| | | | | 222/922 |
| 8,801,064 | B2 * | 8/2014 | Xiques | 43/54.1 |
| 8,806,803 | B1 * | 8/2014 | Mitchell et al. | 43/54.1 |
| 9,137,981 | B1 * | 9/2015 | Groves, Jr. | A47B 81/005 |
| 2002/0166281 | A1 * | 11/2002 | Broberg | 43/21.2 |
| 2004/0025404 | A1 * | 2/2004 | Thompson | 43/21.2 |
| 2004/0237372 | A1 | 12/2004 | Fraser | |
| 2005/0178041 | A1 * | 8/2005 | Zaffiro | 43/21.2 |
| 2005/0252071 | A1 * | 11/2005 | Urban | 43/54.1 |
| 2005/0257417 | A1 * | 11/2005 | Black et al. | 43/21.2 |
| 2006/0254118 | A1 * | 11/2006 | Warecke | 43/21.2 |
| 2006/0265934 | A1 * | 11/2006 | Morris | 43/21.2 |
| 2007/0256348 | A1 * | 11/2007 | Fox | 43/54.1 |
| 2008/0073478 | A1 * | 3/2008 | Gates et al. | 248/523 |
| 2008/0295383 | A1 * | 12/2008 | Wakefield et al. | 43/21.2 |
| 2009/0119969 | A1 * | 5/2009 | Cavanaugh | 43/21.2 |
| 2011/0131862 | A1 * | 6/2011 | Magarelli et al. | 43/21.2 |
| 2011/0174678 | A1 * | 7/2011 | Champlin | A47F 13/00 |
| | | | | 206/373 |
| 2011/0179692 | A1 * | 7/2011 | McKnight et al. | 43/21.2 |
| 2012/0110889 | A1 | 5/2012 | DeSpiegelaere et al. | |
| 2012/0151818 | A1 * | 6/2012 | Orth | 43/21.2 |
| 2014/0165451 | A1 * | 6/2014 | Scheibmeir | 43/57 |
| 2014/0331543 | A1 * | 11/2014 | Hancock | 43/54.1 |
| 2014/0360086 | A1 * | 12/2014 | Finlan | 43/21.2 |
| 2015/0201601 | A1 * | 7/2015 | Honermann | A01K 97/01 |
| | | | | 211/70.8 |

FOREIGN PATENT DOCUMENTS

| | | | | |
|---|---|---|---|---|
| JP | 09037698 | A * | 2/1997 | A01K 97/10 |
| JP | 10337141 | A * | 12/1998 | A01K 97/10 |
| JP | 2001251999 | A * | 9/2001 | A01K 97/10 |
| JP | 2013046581 | A * | 3/2013 | A01K 97/10 |
| KR | 101321982 | B1 * | 10/2013 | |

* cited by examiner

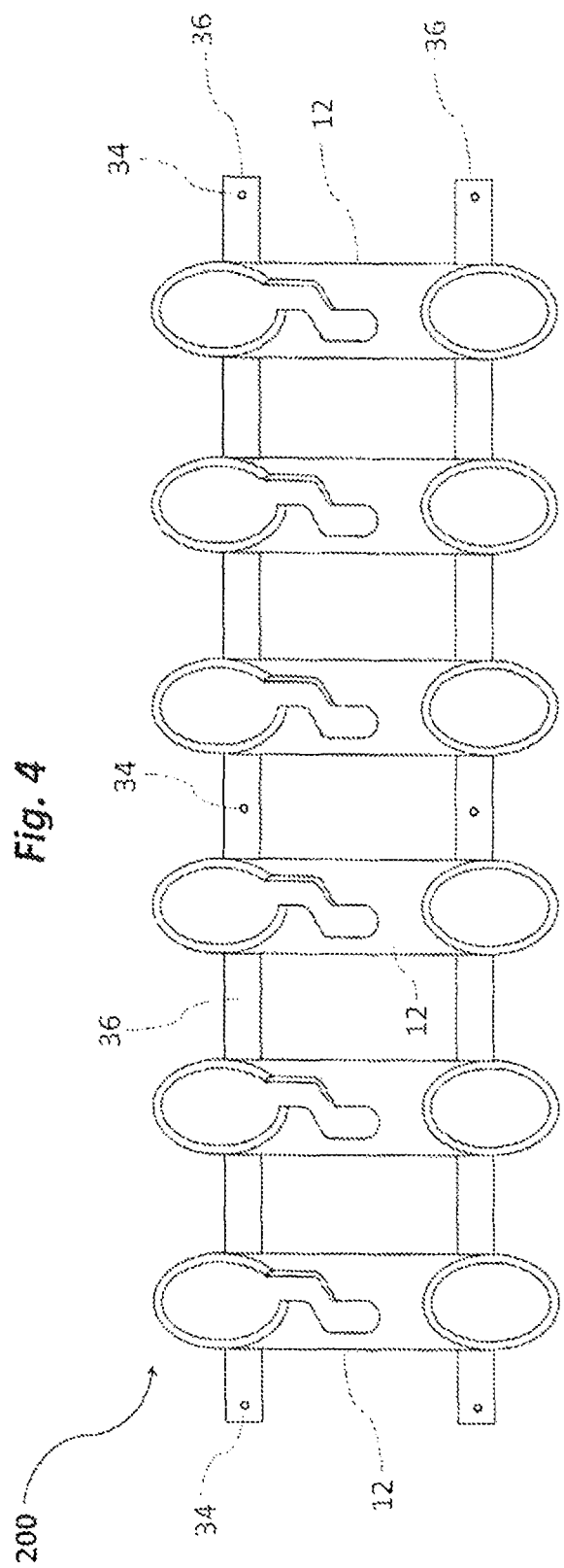

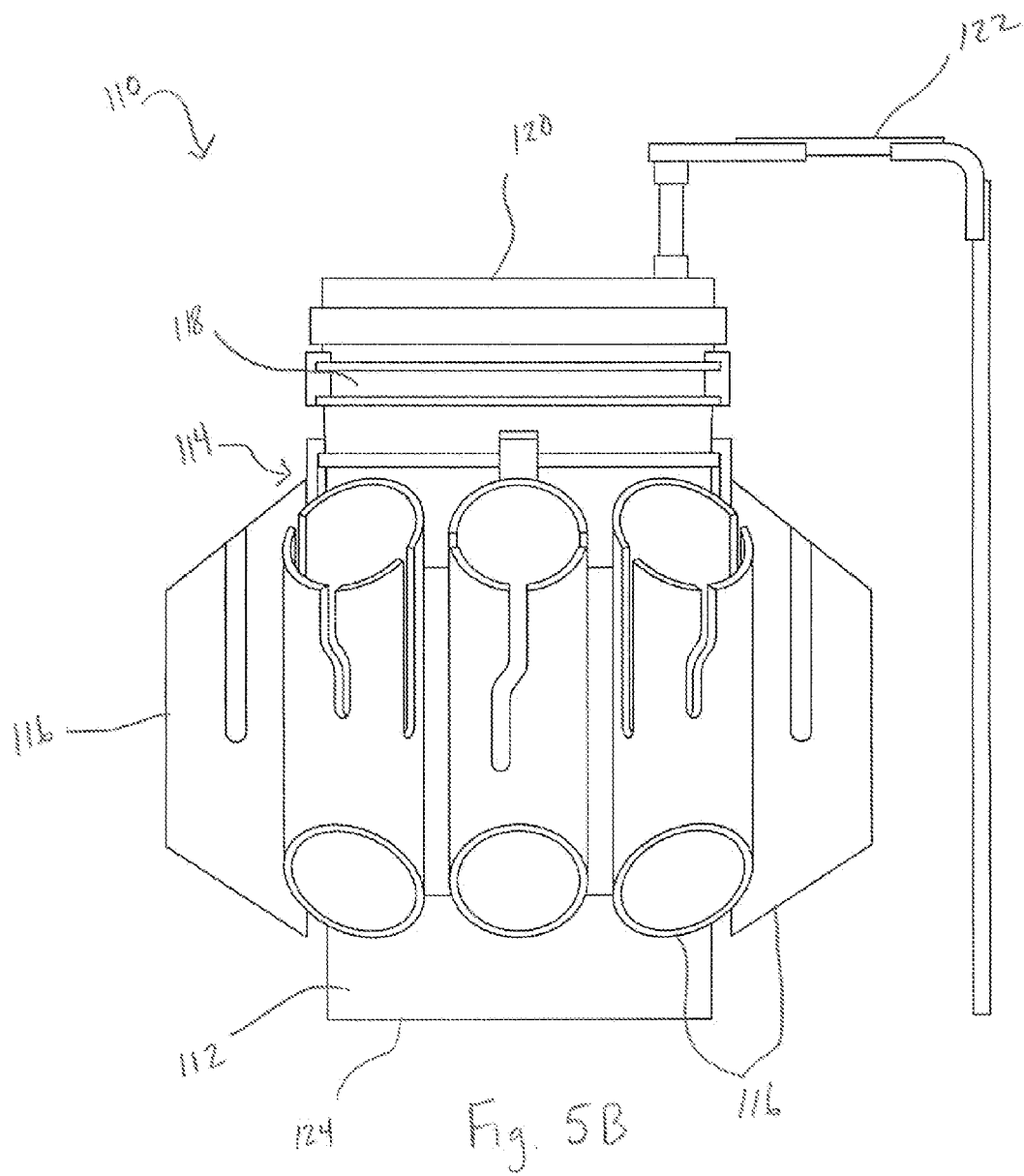

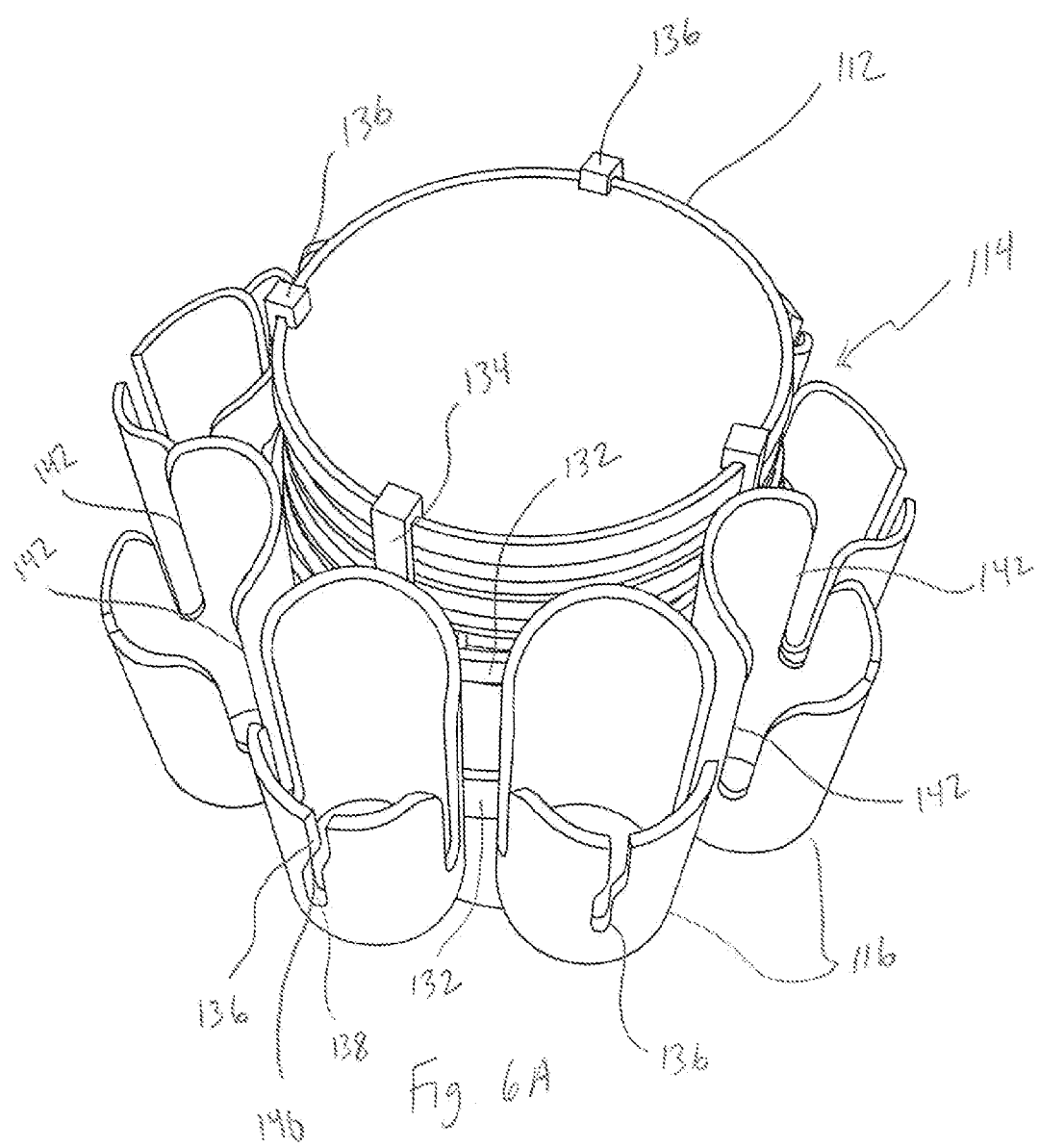

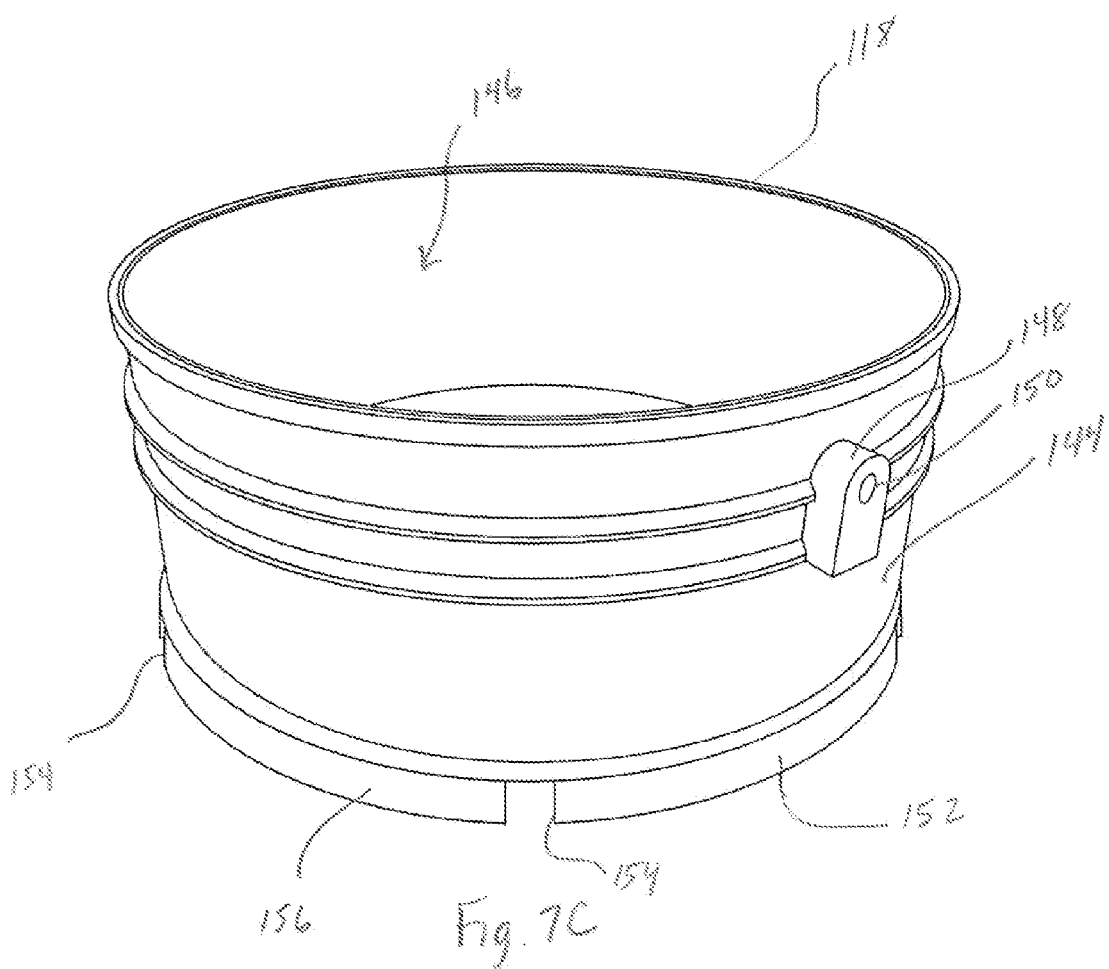

ICE FISHING STORAGE AND TRANSPORT SYSTEM

RELATED APPLICATION INFORMATION

This application is a continuation-in-part of U.S. patent application Ser. No. 13/233,136 filed Sep. 15, 2011, which claims the benefit of U.S. Provisional Application 61/456,278, filed Nov. 4, 2010, each of which are hereby incorporated by reference.

FIELD OF THE INVENTION

The present invention relates to holders for ice fishing rods and other equipment and more particularly to portable devices for holding ice fishing rods and other ice fishing equipment during storage, transport and/or use.

BACKGROUND OF THE INVENTION

Most fishermen own a number of fishing poles, whether for ice fishing or fishing on open water. As such, fishermen commonly transport multiple fishing rods at a time and sometimes fish with more than one rod at a time.

A number of fishing rod holders have therefore been designed to support fishing poles either for transport of during fishing. For example, U.S. Pat. No. 3,603,019 to Smeltzer teaches attaching a fishing pole holder attached to a fishing bucket at angle to the bucket to support fishing rods during fishing. U.S. Pat. No. 5,303,500 to Luukonen depicts a bucket with an attached tray having various compartments for holding fishing gear, including slots that grasp and retain a fishing rod tip to retain the fishing rod. U.S. Pat. No. 7,594,353 to Lucky and U.S. Publ. Pat. App. No. 2005/0252071 to Urban utilize hollow tubes attached to a bucket for the purpose of supporting a fishing rod, U.S. Pat. No. 5,491,923 to Zingrone supports a fishing rod at an angle from a bucket with a cradle attached to the bucket.

There are various drawbacks to each of these designs. For example, they may not be suitable for both transport of fishing rods and supporting rods during fishing, they may cause damage to fishing rods, and they may not stably support the rod to prevent accidental dislodgement from the holder or may not allow rods to be easily inserted into the holder.

In addition, fishing requires significant additional equipment such as fishing lures or hooks, fishing line, etc. It can also be desirable in ice fishing in particular to utilize a fish finder that includes a device housing, a battery, and associated cables. Thus, a fisherman or ice fisherman may also be required to carry a number of containers that hold various equipment in addition to one or more fishing poles or, in the case of ice fishing, tip-ups.

SUMMARY OF THE INVENTION

An ice fishing equipment storage and transport system or kit provides easier and more organized retention of ice fishing equipment when being stored, transported, or in use. System can include a container such as a bucket having an open interior. A sleeve can be selectively attachable to the bucket and include one or more rod holder tubes, the rod holder tubes having one or more channels or slots adapted to hold an ice fishing rod or tip-up. A bucket container extension portion can attach to the bucket to capture and retain the sleeve between the bucket and the extension. The system can also include a lid for covering the bucket. In some embodiments, the lid can include additional features such as a selectively attachable transducer guide channel and an opening allowing for passage of a battery cable.

The above summary of the various embodiments of the invention is not intended to describe each illustrated embodiment or every implementation of the invention. This summary represents a simplified overview of certain aspects of the invention to facilitate a basic understanding of the invention and is not intended to identify key or critical elements of the invention or delineate the scope of the invention.

BRIEF DESCRIPTION OF THE DRAWINGS

The invention may be more completely understood in consideration of the following detailed description of various embodiments of the invention in connection with the accompanying drawings, in which:

FIG. 4 depicts a front elevation view of a fishing rod holder in accordance with an embodiment of the present invention.

FIG. 5B depicts a side view of the ice fishing transport and storage system of FIG. 5A.

FIG. 6A depicts a rod holder sleeve and a bucket of an ice fishing transport and storage system according to an embodiment of the present invention.

FIG. 7C depicts a bucket extension of an ice fishing transport and storage system according to an embodiment of the present invention.

Figure 1:
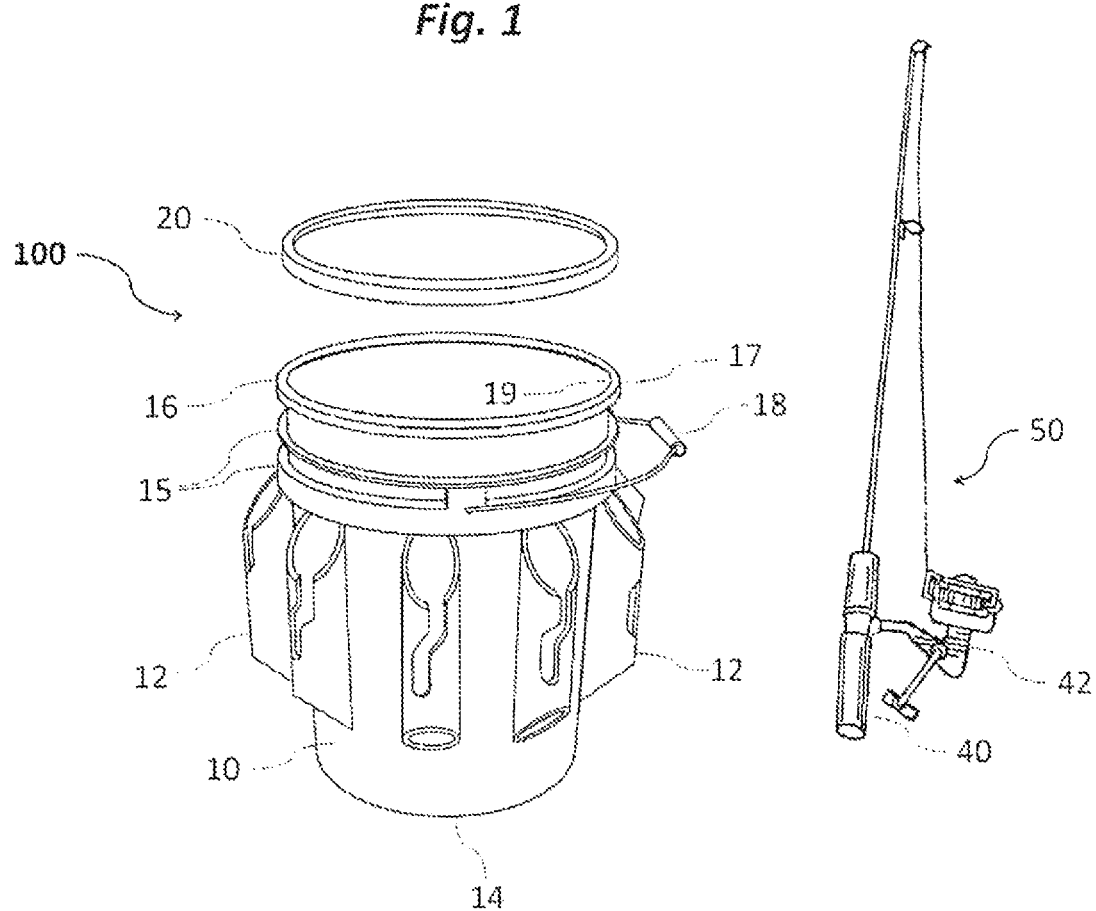
FIG. 1 depicts a perspective view of a fishing rod holder and transport and fishing rod in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

FIG. 1 depicts a fishing rod holder and transport 100 according to an embodiment of the present invention that generally includes a bucket 10 and at least one fishing rod holder tube 12. In one embodiment, bucket 10 is generally cylindrical in shape, with an upper rim 16 defining a top end of the bucket 10 and a generally sealed bottom 14. The side wall of bucket 10 is defined by an inner wall 19 and an outer wall 17 that define an open interior. One or more ridges 15 can project laterally outward from and encompass cylindrical outer wall 17 and upper rim 16 can extend laterally outward from the outer wall 17. In one embodiment, bucket 10 can have a handle 18, which can be coupled to a portion of ridge 15. The bucket 10 can also have a lid 20 which can be removably fitted on to bucket 10, to selectively seal the open interior. The size and shape of the bucket 10 is not critical to the operation of the fishing rod holder and transport 100. The description of bucket 10 provided herein has been supplied for illustrative purposes and various other sized and shaped buckets and other walled objects can be utilized with fishing rod holders as described herein.

Figure 2:
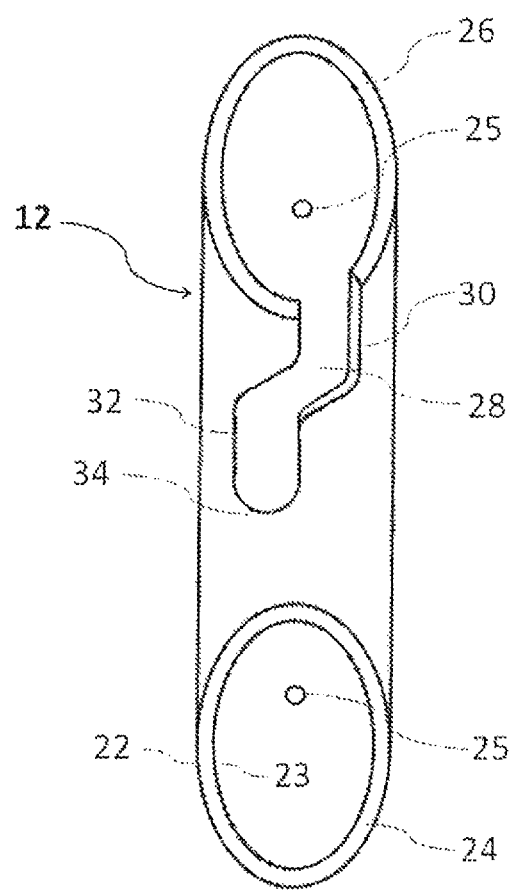
FIG. 2 depicts a front elevation view of a rod holder tube in accordance with an embodiment of the present invention.

A plurality of fishing rod holder tubes 12 configured as slotted thin walled tubes can be fixably coupled to the outer wall 17 of bucket 10. A front elevation view of a rod holder tube 12 is depicted in FIG. 2. Rod holder tubes 12 can be substantially cylindrical in shape defined by an inner wall 23 and an outer wall 22. The lateral ends of rod holder tube 12 can be defined by a top 26 and a bottom 24 that can be beveled at, for example, a 45-degree angle, such that one side of slotted thin walled tube 12 is longitudinally longer than the other side of thin walled tube 12. In some embodiments, rod holder tubes 12 can be generally vertically aligned along the outer wall 17 of bucket 10 such that they are generally perpendicularly aligned with the bottom 14 and the upper rim 16 that defines the open top of the bucket.

A channel or slot 28 traverses the rod holder tube 12 in a generally longitudinal direction via a series of angles. The channel 28 extends through both inner 23 and outer 22 walls. Channel 28 opens towards the top 26 and proceeds in a defined pattern longitudinally down rod holder tube 12 towards the bottom 24. The channel 28 ends prior to reaching the beveled bottom 24. The channel 28 is defined by edges 30 and 32. Edges 30 and 32 begin at top 26 and proceed longitudinally toward bottom 24, and can proceed substantially parallel to the length of rod holder tube 12 as depicted in FIG. 2. Channel 28 then angles to either direction. In one embodiment, this angle can be offset approximately 45-degrees to either side of a line running parallel to the length of thin walled tube 12. The channel 28 can then again proceed longitudinally toward bottom 24. Although much of channel 28 is depicted in FIG. 2 as traversing along a line substantially parallel to the length of thin walled tubing 12, other non-parallel traveling patterns can also be employed. Additionally, the offset of 45-degrees between angles can be deviated from substantially.

Edges 30 and 32 of channel 28 define an insertion path 33 and meet at a bottom of channel to form a support ledge 34. Insertion path 33 allows the shank or stem of a fishing reel attached to a fishing rod to be inserted into channel with little to no interference so that it can be supported on support ledge 34. Edge 32 defines a generally downwardly facing stop feature or projection 35 configured as a ledge that provides a material interference if rod is moved vertically upwards from support ledge 34.

Figure 3:
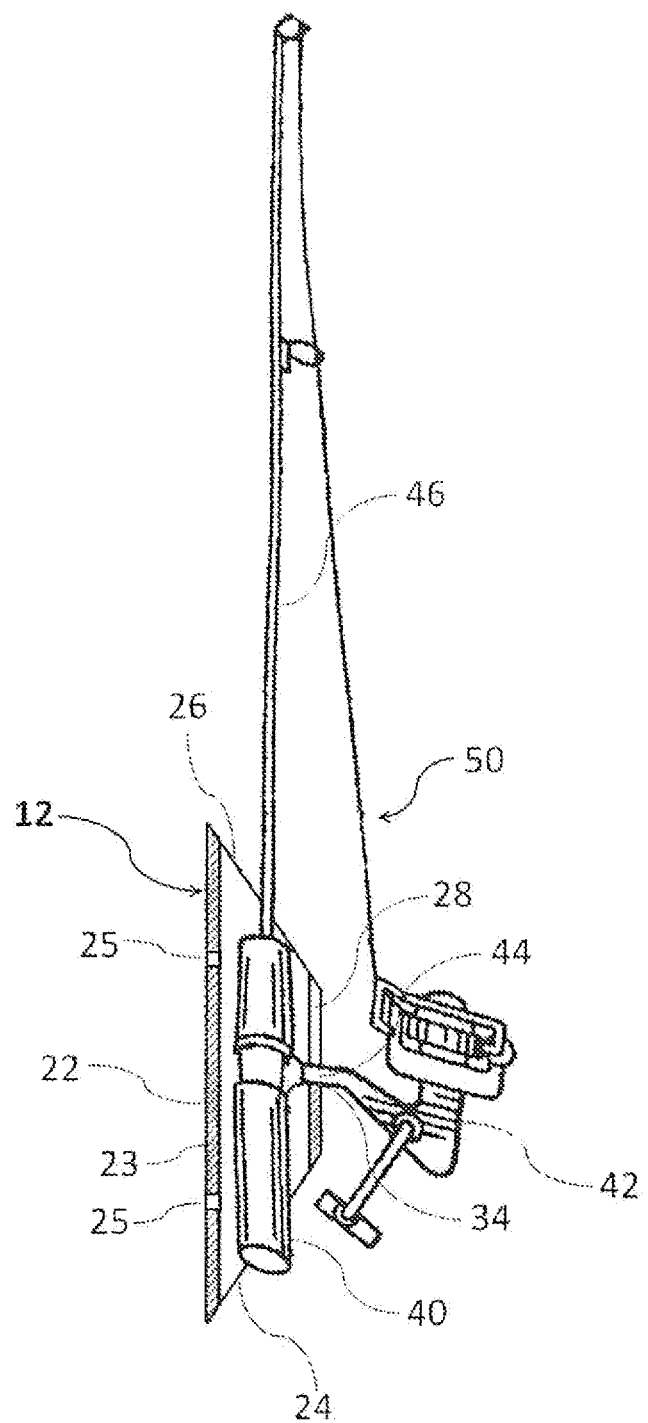
FIG. 3 depicts a side elevation cross sectional view of a rod holder tube with a fishing rod in accordance with an embodiment of the present invention.

When rod holder tube 12 is viewed from in cross-section from the side, as in FIG. 3, it can be seen how channel 28 supports fishing rod 50. Fishing rod 50 consists of a rod 46, extending from a handle 40. Reel 42 connects to fishing rod 50 at handle 40 via reel stem 44. When housed in the channel 28 of fishing rod holder 12, the weight of fishing rod 50 is supported by the reel stem 44 where it rests on the support ledge 34 portion of channel 28. Rod 50 can be inserted into rod holder tube 12 by inserting rod handle 40 into the inner diameter of the rod holder tube 12 and aligned the real stem 44 with the channel 28. So that real stem 44 slides down insertion path 35 until it reaches support ledge 34. The smooth curves of insertion path 33 defined by edge 30 allow the stem to slide in with little resistance.

Fishing rod 50 can be removed from the rod holder tube 12 by lifting up on the fishing rod 50 while turning it or sliding it laterally slightly to allow the reel stem 44 to pass by the stop feature 35 along the angled path of channel 28. Because the reel stem 44 must follow the ridged path of the angled pattern in channel 28 to be released, the likelihood that fishing rod will inadvertently come out of fisher rod holder 12 is reduced. In addition, the downwardly acing stop feature 35 serves to prevent the rod from being dislodged due to vertical movement because it will block pure upward movement of the reel stem 44 beyond stop feature 35. Thus, the channel 28 effectively creates a locking mechanism, whereby fishing rod 50 can be secured in place in fishing rod holder 100 without fear of the rod 50 tipping over or falling out, getting stepped on, or being dragged into the water by a fish. However, as described above, channel 28 also provides for easy insertion of rod 50. In addition, rod 50 is supported purely by the stem 44 of the reel 42 resting on the support ledge 34, and therefore no portion of the rod or rod tip is restrained, eliminating the possibility of damage to the fragile rod that is present in fishing holders that engage the rod body and/or rod tip.

FIG. 4 depicts a fishing rod holder 200 according to another embodiment of the present invention. Rod holder 200 includes a plurality of rod holder tubes 12 are employed. However, instead of being fixably coupled to a bucket, embodiment 200 depicts the rod holder tubes 12 fixably coupled to two flexible strips 36, which can be later mounted to a wall or other surface. Several holes 34 are drilled into strips 36 to allow the fishing rod holder 200 to be easily attached to a variety of surfaces. The holes 34 can by spaced 18 inches apart to align with standard wall stud spacing. In other embodiments, strips 36 strips can utilize an adhesive or Velcro to attach to surfaces. Flexible strips can be adjusted to fit nearly any surface and any number of strips can be used as necessary. Some possibilities include, for example, a wall, an inner or outer surface of a boat, a bucket, a dock or a metal rod. Rod holder 200 can also be attached to these or other surfaces, such as the gunnel of a boat or a dock, to support one or more rods while being used during fishing.

In one embodiment, rod holder tubes 12 can be made from 1.5 inch PVC piping. In another embodiment, rod holder tubes 12 can be stamped out of sheet metal and bent into a cylindrical shape. Ends 24 and 26 can be cut at 45-degree angles. Cuts can be aligned so that the beveled ends 24 and 26 of the thin walled tube 12 angle towards one another, thereby forming a shorter and longer side when measured longitudinally. In one embodiment, the back of thin walled tube can be approximately 6 inches in height. Channel 28 can be cut into the front of the tube 12 and in one embodiment can be approximately 0.625 inches in width. Channel can be cut to approximate the above description, ending at support ledge 34 approximately 1 inch from end 24. In one embodiment, the angled portion of the channel 28 can extend for approximately ¾ inch. One or more holes 25 can be drilled into the back of tubes 12 for mounting purposes. Holes 25 should be large enough to allow standard sized fasteners to easily pass through them. Although rod holders 12 are described herein as having a generally cylindrical shape, it should be noted that any other generally enclosed shape will suffice, such as, for example, square or rectangular.

A bucket 10 can be prepped for attaching the rod holder tubes 12 by drilling a series of holes aligning with holes 25. Strips 36 can also be prepped with holes in a similar manner. The rod holder tubes 12 can then be attached via nuts and bolts or screws or other fasteners to a bucket 10 or strips 36. In other embodiments, rod holder tubes 12 can attach to bucket, strips, or other surfaces via an adhesive, a hook inserted into an opening, Velcro, or any other attachment method. Rod holder tubes 12 can also be individually attached to structures.

Referring now to FIGS. 5A-10, an ice fishing transport and storage system or kit 110 is depicted. Kit 110 can generally include a bucket or container 112, a sleeve 114 having plurality of fishing rod holders 116, a bucket or container extension 118 and a lid 120. A transducer guide 122 can extend from lid 120.

Figure 10:
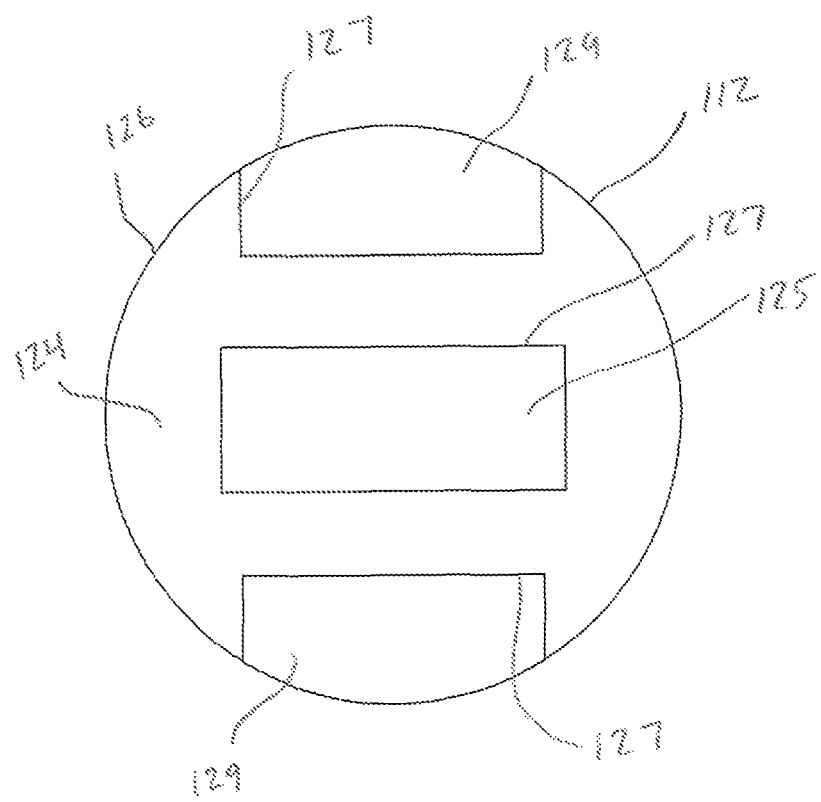
FIG. 10 depicts a top view of a bucket for an ice fishing transport and storage system according to an embodiment of the present invention.

In one embodiment, bucket 112 can be a typical five gallon bucket similar to bucket 10. Bucket can include a bottom 124 and an upwardly extending side wall 126 that extends to an upper rim 128 defining an open interior 130. In some embodiments, side wall 126 can be generally cylindrical. In one embodiment, the inwardly facing surface of the bottom 124 of bucket can include brackets. Brackets can be utilized to hold a tackle box, battery or other ice fishing accessory. In some embodiments, such as shown in FIG. 10, brackets 127 can be positioned relative to each other to form receptacles of various shapes and sizes, such as a battery receptable 125 or tackle box receptacles 129. Brackets can comprise continuous, upwardly extending flanges as shown in FIG. 10 or discrete projections. In some embodiments, brackets can be movable in order to be adjusted to firmly hold tackle boxes, etc. of different sizes. In such an embodiment, brackets can selectively be insertable onto various pegs extending upwardly from or depressions extending inwardly into the bottom 124 of the bucket.

Figure 6B:
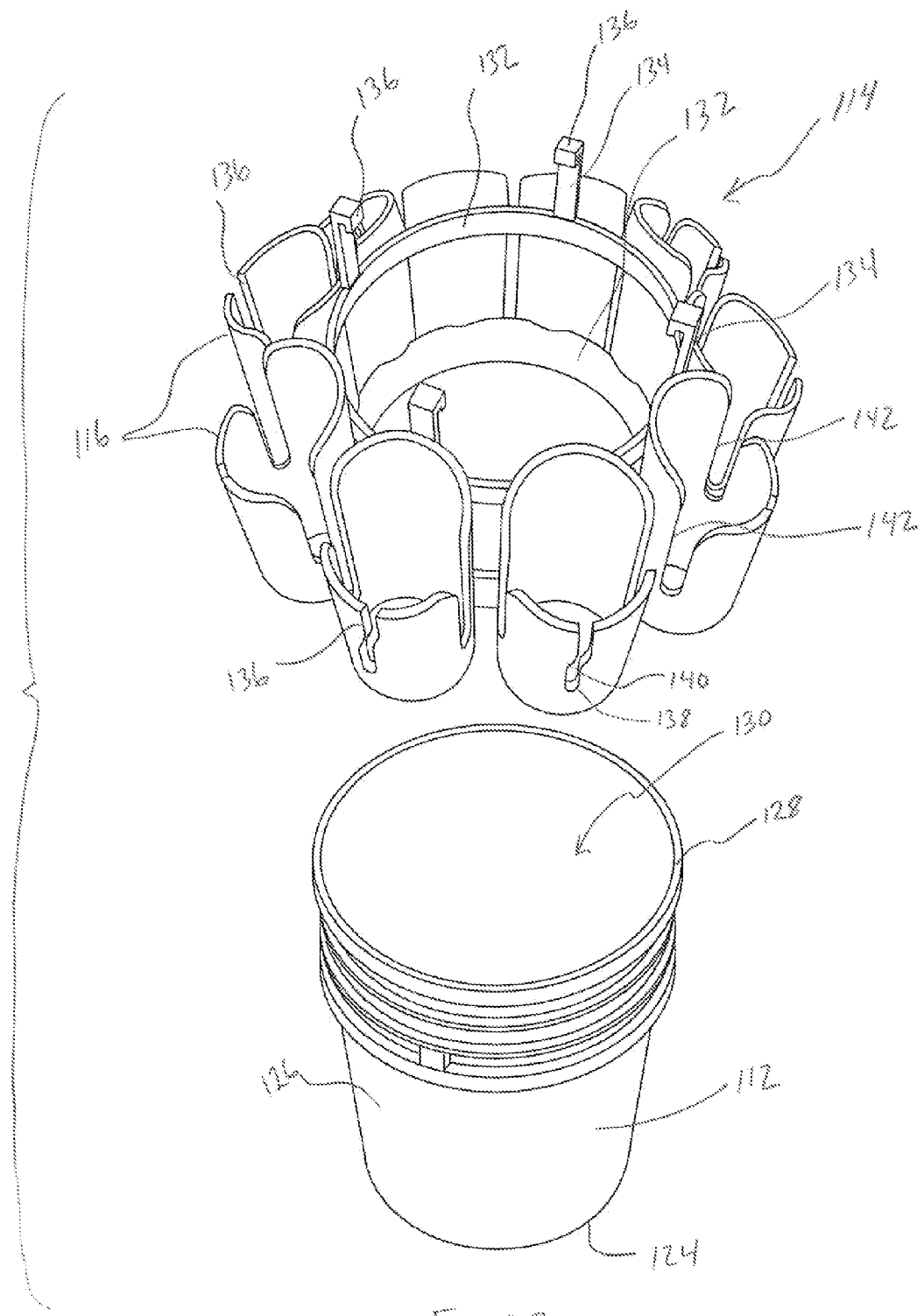
FIG. 6B depicts a rod holder sleeve and a bucket of an ice fishing transport and storage system according to an embodiment of the present invention.

Sleeve 114 can include a frame of one or more rings 132 with a plurality of rod holders 116 attached to the rings. A plurality of straps 134 can extend upwardly from the top ring 132 or from some or all of the holders 116. Each strap 134 can have a hook 136 at a distal portion of the corresponding strap 134. As can be seen in FIG. 6A, hooks 136 can be sized and shaped to fit over upper rim 128 of bucket 112. In one embodiment, rings 132 extend 360 degrees to completely encircle bucket 112. In other embodiments, rings 134 can form arcs of less than 360 degrees and one or several sleeves 114 can be used on any given bucket. Both rings 132 and straps 134 can be rigid or flexible. Although shown as being generally circular to match the outer perimeter of bucket 112, frame 132 can have any other shape. Generally, though not always, frame 132 will have a shape matching an outer perimeter of an associated container.

Each sleeve 114 includes one or more rod holder tubes 116. Rod holder tubes 116 can be permanently or fixedly attached to rings 132. Although tubes 116 are depicted as having an elongated, ellipsoid cross section, tubes 116 can also be generally circular. Each rod holder tube 116 can includes an outwardly facing slot 136. Slot 136 can have a configuration similar to slot 28 described herein for retaining a fishing rod therein on a support ledge 138 with a stop ledge 140 to prevent accidental dislodgement. Rod holder tubes 116 can also include a pair of generally parallel side slots 142. Side slots 142 can extend generally vertical downwardly from top surface of holders 116. Side slots 142 can be adapted to retain the rectangular frame of an ice fishing tip up. In one embodiment, at least one and possibly all rod holder tubes 116 on a given sleeve 114 have both slot 136 and side slots 142. Thus, such rod holder tubes 116 are versatile in being able to hold either a fishing rod or a tip up. In other embodiments, sleeves 114 can be provided with an assortment of rod holder tubes 116, some with slots 136, some with side slots 142 and/or some with both types of slots. One rod holder tube can be adapted to retain a scoop for scooping ice out of a fishing hole. Such a rod holder tube can include a generally reversed L-shape extending downwardly from the top of the tube for retaining a handle of the scoop therein. In embodiment, each rod holder tube has an approximately two inch, generally circular inner diameter.

Figure 7A:
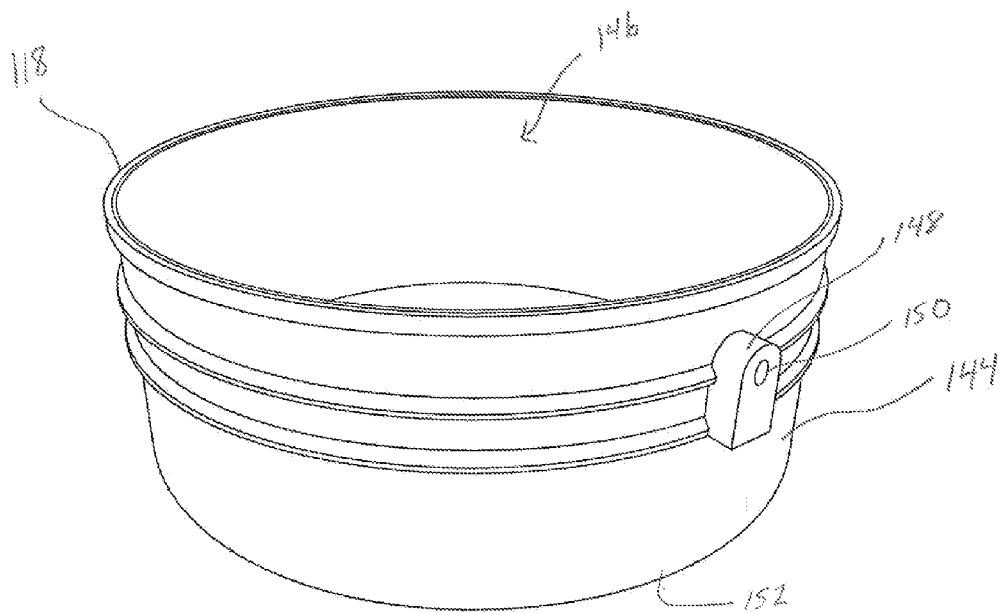
FIG. 7A depicts a bucket extension of an ice fishing transport and storage system according to an embodiment of the present invention.
Figure 7B:
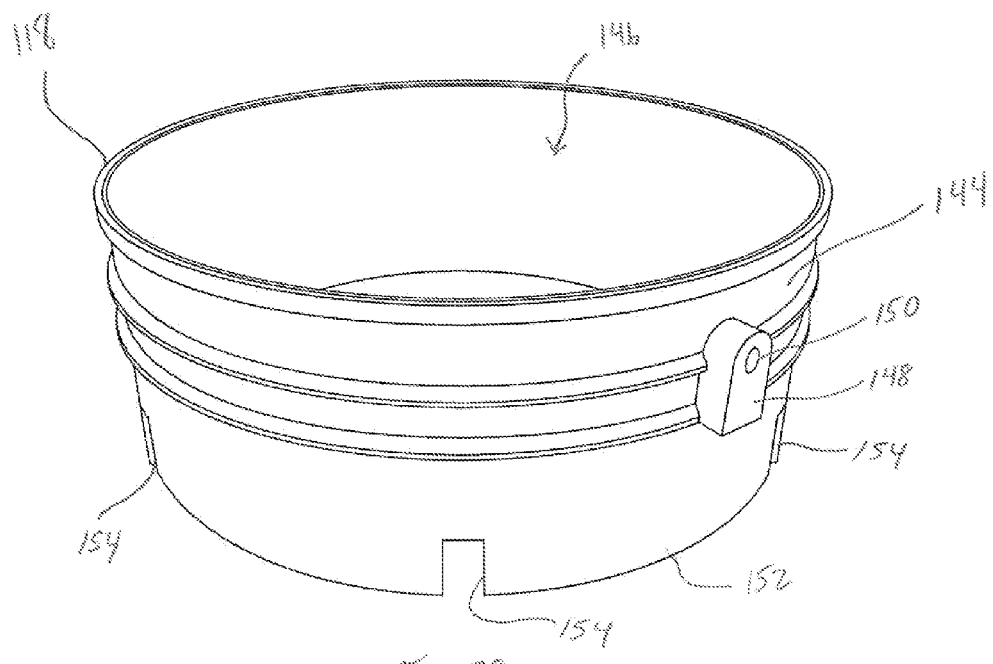
FIG. 7B depicts a bucket extension of an ice fishing transport and storage system according to an embodiment of the present invention.
Figure 8:
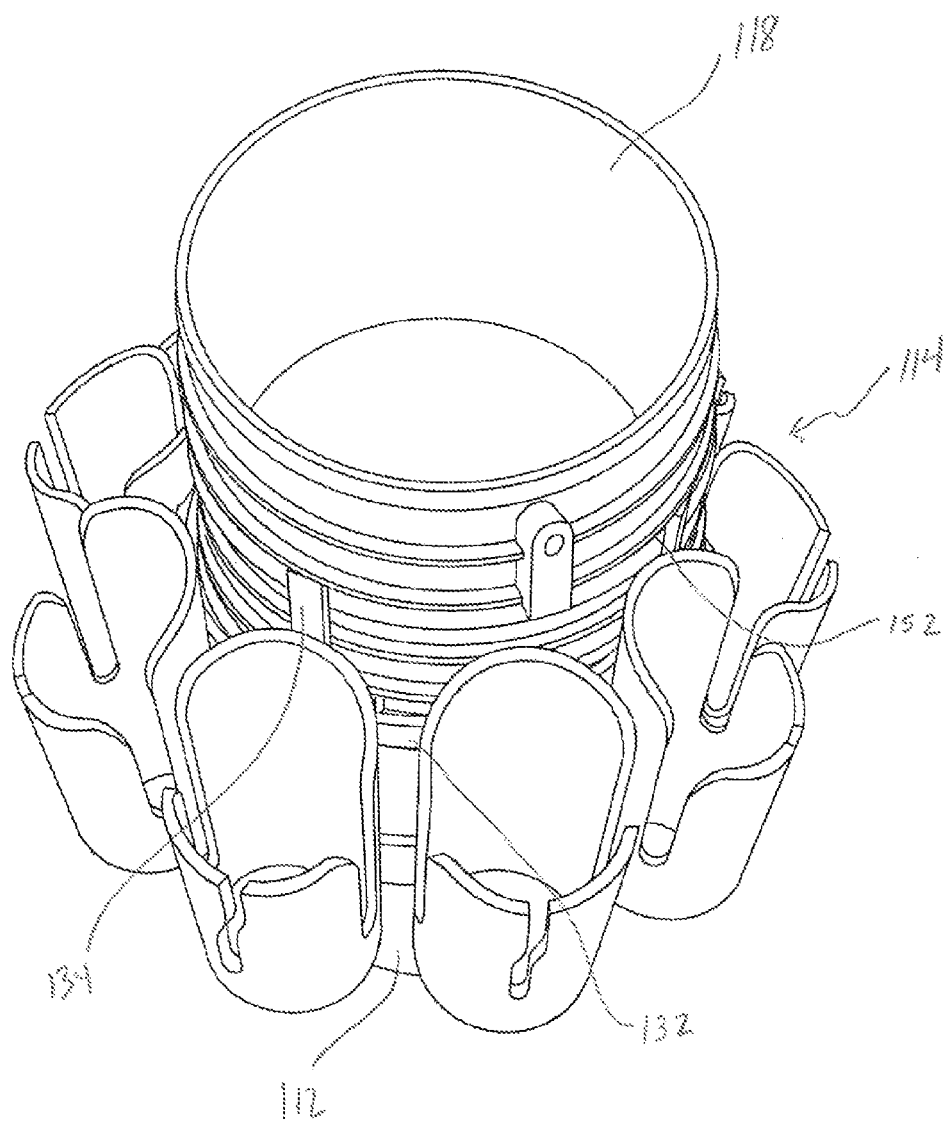
FIG. 8 depicts an ice fishing transport and storage system according to an embodiment of the present invention.

Referring now to FIGS. 7A-7C, there can be seen a bucket or container extension 118 that can be used with ice fishing storage and transport systems according to embodiments of the present invention. Bucket extension 118 can be generally cylindrical with a body 144 defining an outer perimeter and a hollow interior 146. Typically, bucket extension 118 will have an outer perimeter size and shape that matches the outer perimeter and shape of a corresponding bucket 112. Bucket extension 118 can also include flanges 148 having apertures 150 for receiving and retaining therein an end of handle for carrying system 100. Body 144 defines a bottom portion 152 used to attach to upper rim 128 of bucket 112 to capture sleeve 114 between bucket extension 118 and bucket 112. As shown in FIG. 7A, a continuous bottom surface 152 extending around body 144 can be used to capture sleeve 114. In an embodiment shown in FIG. 7B, a plurality of notches 154 can be defined in body 144 adjacent bottom surface 152. Notches 154 can receive hooks 136 of straps 134 to provide for enhanced retention of sleeve 114 between bucket extension 118 and bucket 112. Similarly, as shown in FIG. 7C the bucket extension 118 can include a flange 156 that extends downwardly from body 144 that includes notches 154. Such a flange 156 can be flexible and/or flare slightly outwardly from body 144 in order to provide a snap fit with top rim 128 of bucket 112. In an alternate embodiment not depicted, a fishing rod transport and storage system can omit a bucket or container extension such as extension 118 and can instead include a lid similar to lid 120 that functions as an extension or means to capture the sleeve 114 between the bucket 112 and lid.

Figure 5A:
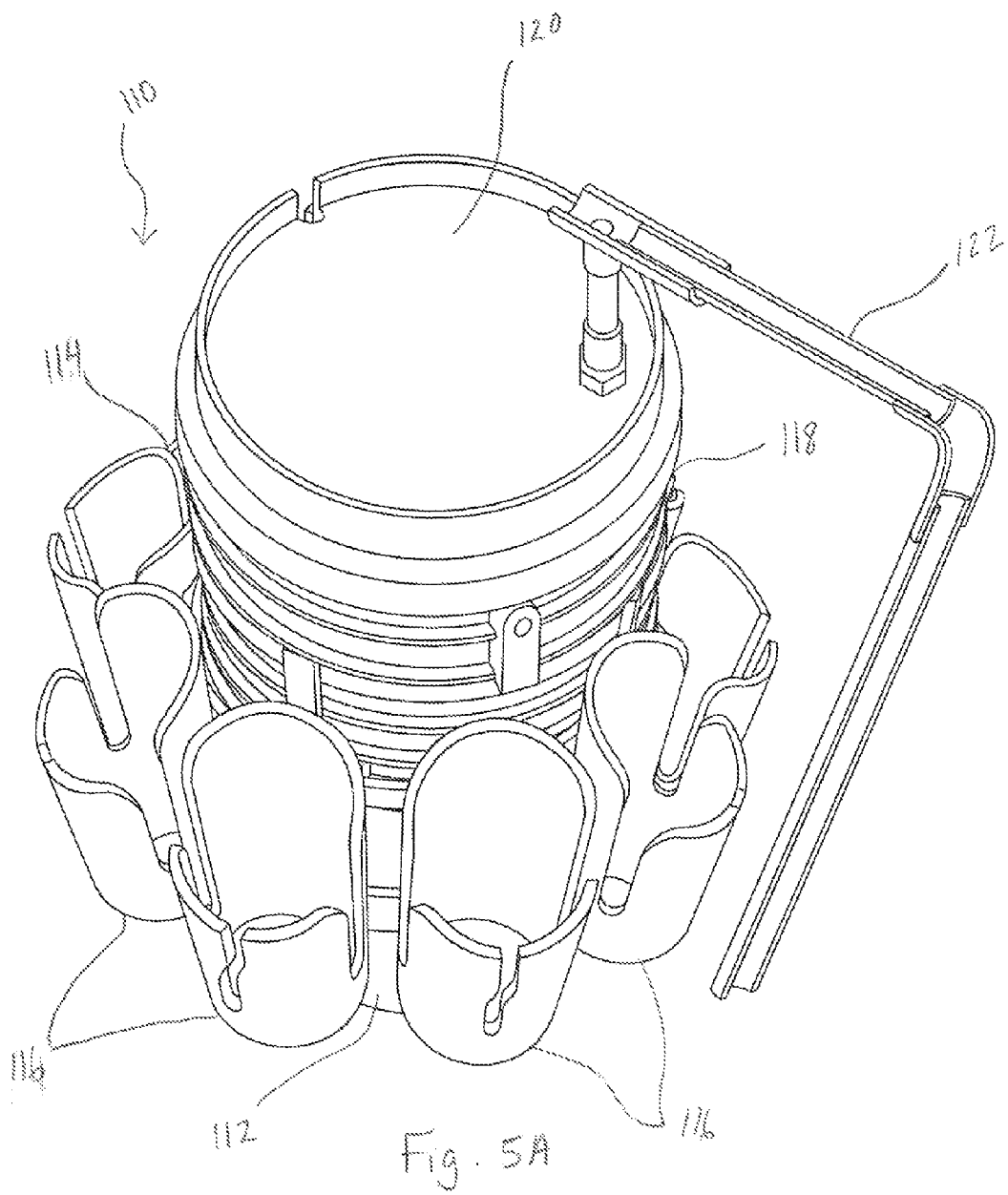
FIG. 5A depicts a perspective view of an ice fishing transport and storage system according to an embodiment of the present invention.
Figure 5C:
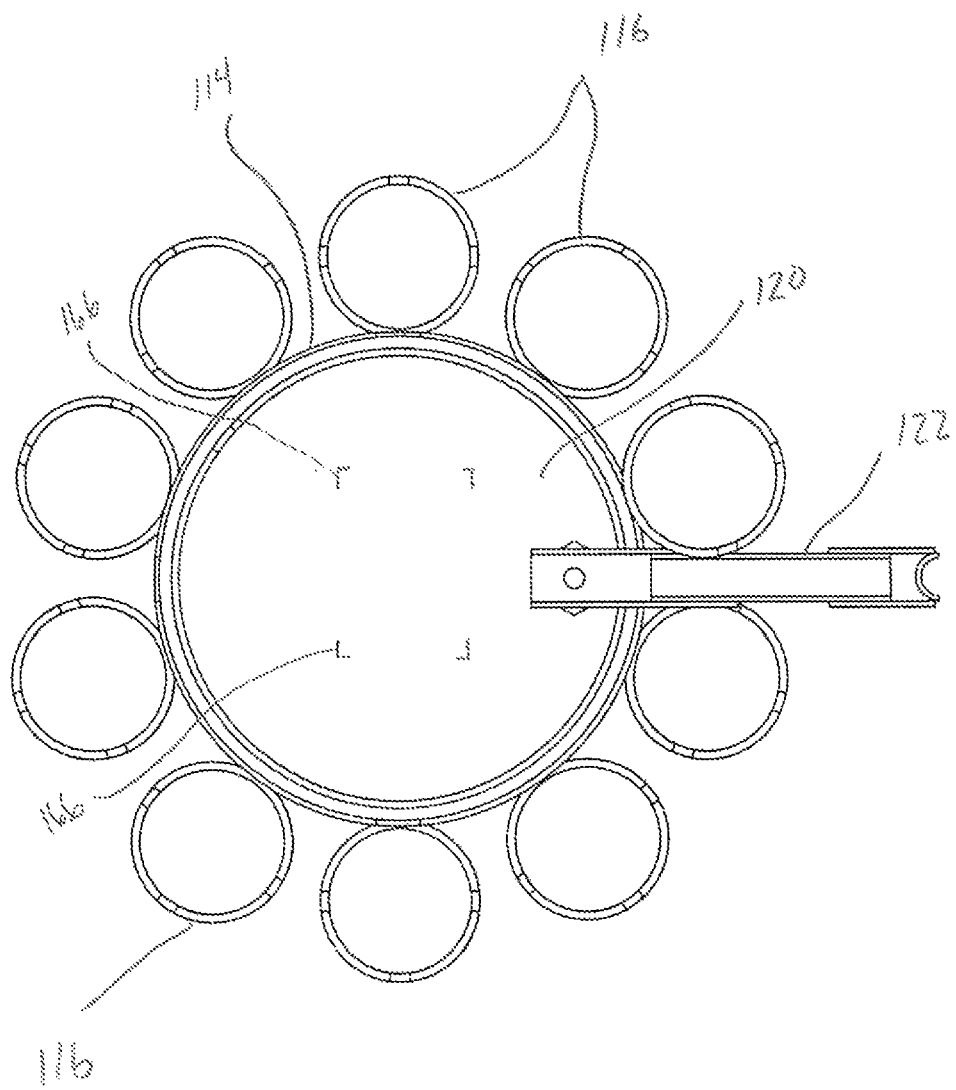
FIG. 5C depicts a top view of the ice fishing transport and storage system of FIG. 5A.
Figure 9:
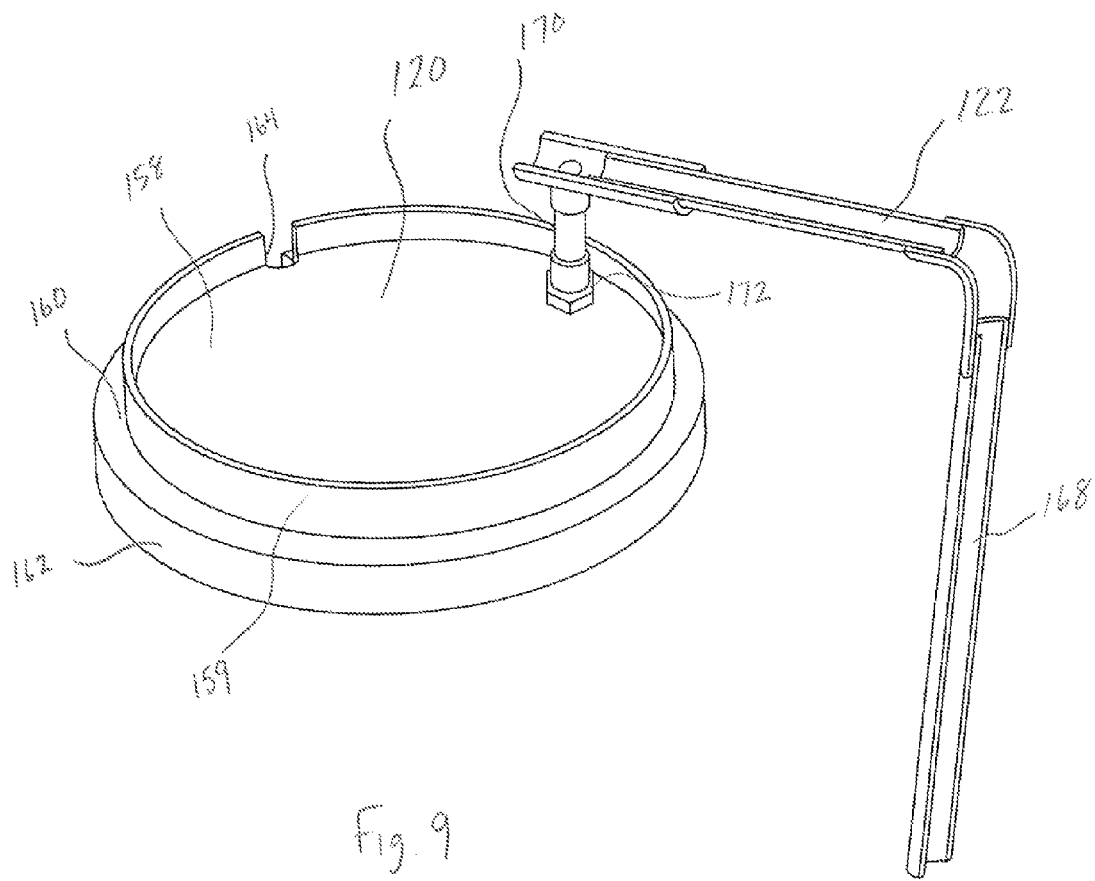
FIG. 9 depicts a portion of an ice fishing transport and storage system according to an embodiment of the present invention.

A lid 120 for an ice fishing and storage transport system 100 according to an embodiment of the present invention is depicted in FIG. 9 and can also be seen in FIGS. 5A-5C. Lid 120 can include a top surface 158 with an upwardly extending lip 159 and a body 160 with a downwardly extending flange 162. Flange 162 can be adapted to snap onto an upper surface of bucket extension 118 and can also be adapted to snap onto an upper surface of bucket 118 in the typical fashion in which a lid is attached to a standard live gallon bucket. A cord aperture 164 can extend through at least the top surface 158 of the lid 120 to allow, for example, a power cord to be run from a battery disposed in the interior 130 of the bucket 112 to a fish finding device located exterior of the bucket 112.

In some embodiments, top surface 158 of lid can be adapted to support a fish finding device on a surface thereof. In one embodiment, lid 120 is flipped over for a use position from a transport position and fish finding device is therefore supported on an underside of top surface 158. Alternatively, lid 120 can remain in the same orientation for both transport and use, such that a fish finding device can be supported on an upper side of top surface 158. In some embodiments, one or both sides of top surface 158 can include one or more brackets 166 for retaining fish finding device or other items thereon, such as depicted in FIG. 5C. Transducer guide 122 attaches to lid 120 to guide the transducer of a fish finding device to an ice fishing hole. Transducer guide 122 includes a channel 168 that extends laterally from lid 120 adjacent where fish finding device would be located and then downwardly towards where an ice fishing hole would be located. In one embodiment, channel 168 can be generally U-shaped in cross-section. The guide 122 serves to ensure proper alignment and positioning of the transducer while also preventing tangling of cords. Transducer guide 122 can connect to lid 120 thorough a guide aperture (not shown) through lid. In one embodiment, a rod 170 can extend downwardly from channel 168 and attach to a bushing 172. Bushing 172 can have a threaded end that extends through guide aperture for threadably receiving a connector that affixes the guide 122 to the lid 120. In this manner, transducer guide 122 can be selectively attached to the lid 120 during use and removed from the lid 120 during transport.

Figure 11:
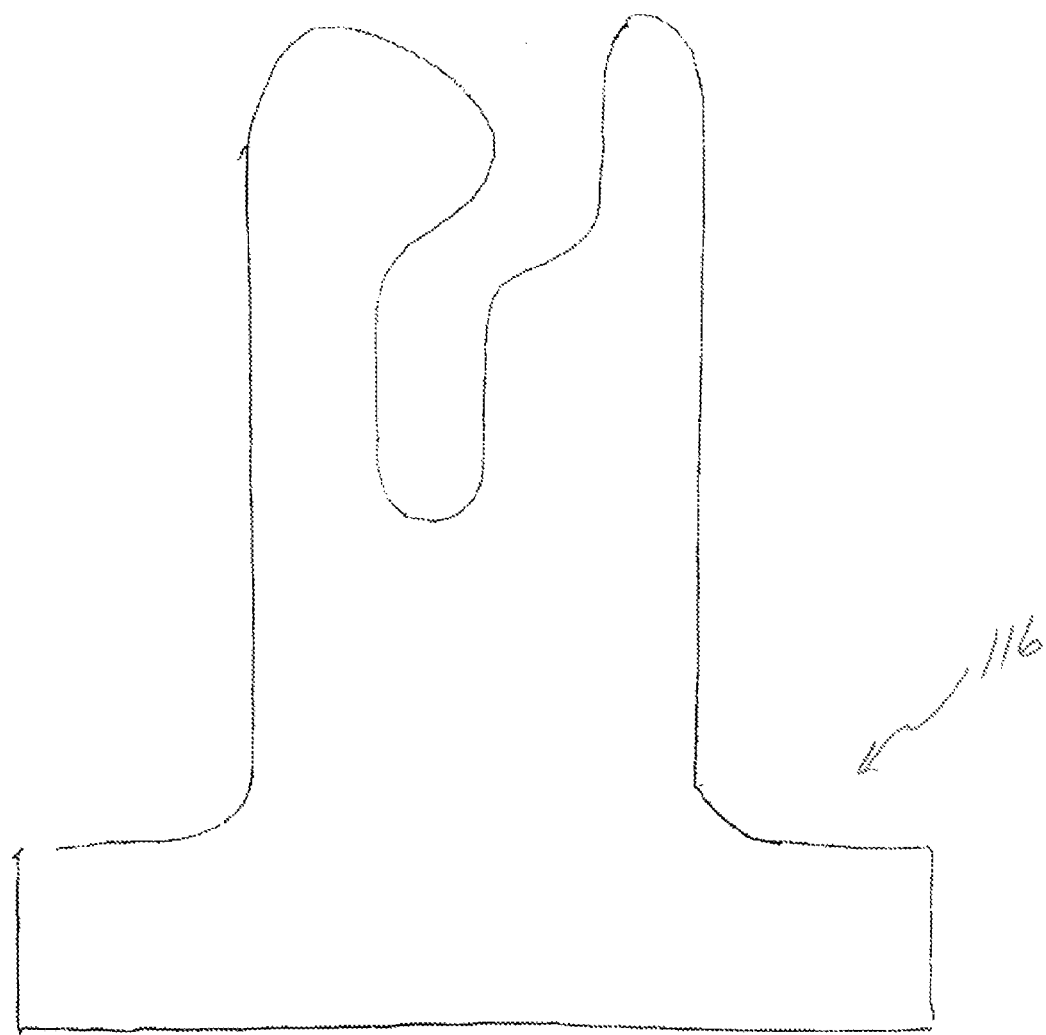
FIG. 11 depicts a rod holder tube according to an embodiment of the present invention.

In one embodiment, rod holder tubes 116 can be molded from a flat sheet of material, such as a plastic material, as shown in FIG. 11. A subsequent manufacturing step can then form the generally cylindrical rod holder tube 116 from the flat blank.

Although described with respect to storing and transporting ice fishing equipment, it is noted that the bucket system described herein may have uses for transporting other types of equipment.

Various embodiments of systems, devices and methods have been described herein. These embodiments are given only by way of example and are not intended to limit the scope of the present invention. It should be appreciated, moreover, that the various features of the embodiments that have been described may be combined in various ways to produce numerous additional embodiments. Moreover, while various materials, dimensions, shapes, installation locations, etc. have been described for use with disclosed embodiments, others besides those disclosed may be utilized without exceeding the scope of the invention.

The invention claimed is:

1. A kit for transportation and storage of ice fishing equipment, comprising:
 a generally cylindrical bucket having an open interior defined by a bottom and an upwardly extending sidewall terminating at an upper rim;
 a plurality of rod holder tubes attached to an exterior surface of the sidewall of the bucket, at least one rod holder tube of said plurality of rod holder tubes having an open top surface and a bottom surface with a wall extending therebetween and three slots with each slot extending downwardly from an upper rim defined by the open top surface of the at least one rod holder tube and terminating prior to the bottom surface of the at least one rod holder tube, the three slots including a pair of opposing, parallel slots and a third slot disposed between the parallel slots, the third slot having at least a portion along a length thereof which is non-parallel to a length of the hollow tube defined between the open top surface and the bottom surface of the hollow tube.

2. The kit of claim 1, further comprising:
 a bucket extension defined by a generally cylindrical sidewall defining an open interior and including a bottom portion adapted to attach to the upper rim of the bucket with the generally cylindrical sidewall extending upwardly from the upper rim of the bucket; and
 a lid selectively attachable to the bucket extension to cover the open interiors of the bucket and the bucket extension.

3. The kit of claim 2, further comprising a transducer guide selectively attachable to the lid, the transducer guide defining a channel that extends outwardly from the lid when the lid is attached to the bucket extension and then downwardly next to the sidewall of the bucket towards the bottom of the bucket.

4. An ice fishing equipment transport and storage kit, comprising:
 a container having a bottom and at least one upwardly extending sidewall terminating at an upper rim and defining an outer perimeter and an open interior;
 at least one fishing rod holder tube attached to an exterior surface of the sidewall of the container, the at least one fishing rod holder tube including at least one slot defined in an outer surface of the at least one fishing rod holder tube adapted to hold an ice fishing rod or tip-up;
 a container extension having an outer wall defining a body with an open interior and a bottom portion, the container extension adapted to engage the container with the bottom portion of the container extension engaging the upper rim of the container and the body extending upwardly from the upper rim of the container; and
 a lid selectively attachable to an upper portion of the container extension displaced from the upper rim of the container to cover the open interiors of the container and the container extension, and wherein
 the at least one slot of the at least one fishing rod holder tube includes a first slot extending downwardly from an upper rim of the at least one fishing rod holder tube and terminating prior to a bottom of the at least one fishing rod holder tube, a second slot extending downwardly from the upper rim of the at least one fishing rod holder tube and opposing and parallel to the first slot, and a third slot extending downwardly from the upper rim of the at least one fishing rod holder tube and disposed between the first and second slots.

5. The ice fishing equipment storage and transport kit of claim 4, further comprising a transducer guide selectively attachable to the lid, the transducer guide configured to guide a transducer of a fish finding device from the lid to an ice fishing hole located adjacent to the container.

6. The ice fishing equipment storage and transport kit of claim 5, wherein the transducer guide defines a channel that extends outwardly from the lid when the lid is attached to the container extension and then downwardly next to the sidewall of the container towards the bottom of the container.

7. The ice fishing equipment storage and transport kit of claim 4, wherein the third slot has at least a portion along a length thereof which is non-parallel to a length of the at least one fishing rod holder tube defined between the upper rim and the bottom of the at least one fishing rod holder tube and the third slot defines an upwardly facing support ledge at a bottom portion of the third slot.

8. The ice fishing equipment and storage transport kit of claim 4, wherein the container extension defines a plurality of notches extending upwardly in the same plane as the bottom portion of the container extension.

9. The ice fishing equipment storage and transport kit of claim 4, wherein an inner surface of the bottom of the container includes at least one upwardly extending bracket adapted to retain an item of ice fishing equipment therein.

10. A system for transportation and storage of ice fishing equipment, comprising:

a generally hollow bucket with an open interior defined by a bottom and an upwardly extending sidewall terminating at an upper rim;

a lid adapted to selectively cover the open interior of the bucket;

a transducer guide selectively attachable to the lid and configured to guide a transducer of a fish finding device from the lid to an ice fishing hole located adjacent to the bucket; and a plurality of fishing rod holder tubes attached to the sidewall of the bucket, the rod holder tubes each comprising:

a hollow tube having an open top surface and a bottom surface with a wall extending therebetween; and at least one channel extending through the wall from the open top surface towards the bottom surface, the at least one channel adapted to support at least one of an ice fishing rod or an ice fishing tip-up, and wherein the at least one channel of the hollow tube includes a first channel extending downwardly from an upper rim defined by the open top surface of the hollow tube and terminating prior to the bottom surface of the hollow tube, a second channel extending downwardly from the upper rim of the hollow tube and opposing and parallel to the first channel, and a third channel extending downwardly from the upper rim of the hollow tube and disposed between the first and second channels.

11. The system of claim 10, further comprising a bucket extension having a body and an outer perimeter generally matching an outer perimeter of the bucket sidewall, and configured to be positioned with the body extending upwardly from the bucket sidewall in between the bucket and the lid.

12. The system of claim 10, wherein the transducer guide defines an open channel that extends outwardly from the lid when the lid is attached to the bucket extension and then downwardly next to the sidewall of the bucket towards the bottom of the bucket.

13. The system of claim 10, wherein an inner surface of the bottom of the bucket includes a bracket configured to retain an item of ice fishing equipment thereon.

14. The system of claim 10, wherein the third channel has at least a portion along a length thereof which is non-parallel to a length of the hollow tube defined between the open top surface and the bottom surface of the holder tube and the third channel defines an upwardly facing support ledge at a bottom portion of the third channel.

\* \* \* \* \*